Figure 1:
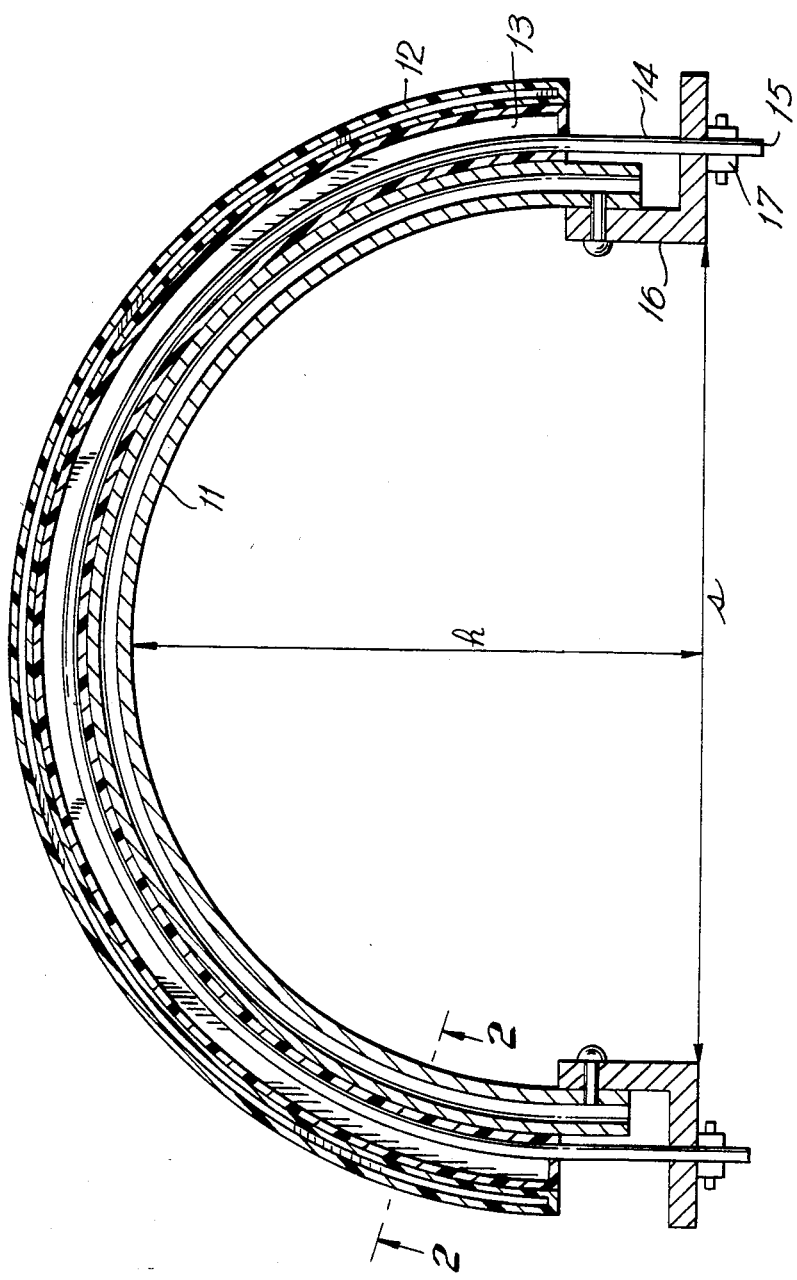

United States Patent [19]

Buchmüller et al.

[11] Patent Number: 4,569,166
[45] Date of Patent: Feb. 11, 1986

[54] CONSTRUCTION INCLUDING A SUPPORTED ELEMENT OF EXTRUDED SYNTHETIC RESIN

[75] Inventors: Hans-Peter Buchmüller, Dieburg; Klaus Kerk, Griesheim; Klaus Kolbe, Reinheim, all of Fed. Rep. of Germany

[73] Assignee: Röhm GmbH, Darmstadt, Fed. Rep. of Germany

[21] Appl. No.: 479,462

[22] Filed: Mar. 28, 1983

[30] Foreign Application Priority Data

Apr. 29, 1982 [DE] Fed. Rep. of Germany ....... 8212293

[51] Int. Cl.$^4$ ............................................. E04B 1/32
[52] U.S. Cl. ......................................... 52/86; 52/200; 52/224; 52/15
[58] Field of Search ................. 52/80, 86, 200, 224, 52/222, 83, 15

[56] References Cited

U.S. PATENT DOCUMENTS

| 1,312,065 | 8/1919 | Wakefield | 52/86 |
| 2,372,187 | 3/1945 | Davison | 52/222 |
| 2,827,138 | 3/1958 | Roy | 52/86 |
| 3,844,086 | 10/1974 | Radtke | 52/464 |
| 4,035,968 | 7/1977 | Caspar | 52/222 |
| 4,055,030 | 10/1977 | Earnshaw | 52/63 |
| 4,059,933 | 11/1977 | Funk | 52/464 |
| 4,284,094 | 8/1981 | Behrend | 52/86 |
| 4,441,291 | 4/1984 | Sokoler | 52/200 |

FOREIGN PATENT DOCUMENTS

| 203565 | 10/1955 | Australia | 52/86 |
| 3009551 | 3/1980 | Fed. Rep. of Germany . | |
| 8010662 | 4/1980 | Fed. Rep. of Germany . | |
| 8130989 | 4/1982 | Fed. Rep. of Germany . | |
| 8304119 | 5/1983 | Fed. Rep. of Germany . | |
| 1443906 | 5/1966 | France | 52/86 |
| 7611652 | 10/1966 | Netherlands | 52/86 |
| WO82/03101 | 9/1982 | PCT Int'l Appl. . | |

Primary Examiner—Henry E. Raduazo
Attorney, Agent, or Firm—Curtis, Morris & Safford

[57] ABSTRACT

What is disclosed is a structural element comprising a surface element of an extruded rigid plastic, said surface element having at least one continuous hollow space and being secured to a support by a rod extending through said hollow space.

5 Claims, 4 Drawing Figures

CONSTRUCTION INCLUDING A SUPPORTED ELEMENT OF EXTRUDED SYNTHETIC RESIN

The present invention relates to a structure comprising a support element, a surface element supported thereon, and fastening means for securing the surface element to the support element. More in particular, said fastening means include a flexible rod extending through a hollow space in said surface element.

It is general practice to fasten rigid plane or curved surface elements made of a synthetic resin to a support element by means of anchors which are secured in openings in the resin surface. This fastening method is labor intensive and often leads to difficulties because of the differential thermal expansion of the synthetic resin and of the material from which the support element is constructed. Fastening by means of peripheral frames which are attached to the support element is also a common practice. This fastening method is very expensive.

It is known from German design patent 80 10 622 to fasten an arcuate surface element made of a rigid plastic to an arcuate support element by means of a mounting strap stretched over the arcuate element. In outdoor applications, the mounting strap is exposed to the weather and must therefore be resistant to, or protected from, weathering. Besides, the overlaid mounting strap often detracts from the appearance.

It has also been proposed to provide plastic multiple-shell surface elements with continuous undercut grooves in which fasteners for attaching the surface element to a support element are anchored. However, pointwise fastening is not always sufficient to divert stresses, acting upon the surface element, to the support element without risk of fracture.

It is known from published German patent application DOS 30 09 551 to secure a plurality of angularly assembled plane surface elements, each having a continuous hollow space therein, in their relative angular positions and to fasten them to a support element by stretching a cord, whose projecting ends are attached to the support element, through the hollow spaces of the assembled surface elements.

The object of the present invention is to provide a structure comprising a support element, a surface element supported thereon which is made of an extruded rigid synthetic resin and which has at least one integrally extruded continuous hollow space therein, and mounting means for securing the surface element to the support element in a way that requires little labor and wherein the mounting means are not in point contact with the surface element and are not exposed on the outer surface of the surface element. The structural element of the invention is adapted to be assembled in rows to form larger building components, for example, light-admitting roofs, barrel-arch structures, terrace roofs, and the like, or for the erection of entire buildings, such as greenhouses or indoor swimming pools.

Figure 2A:
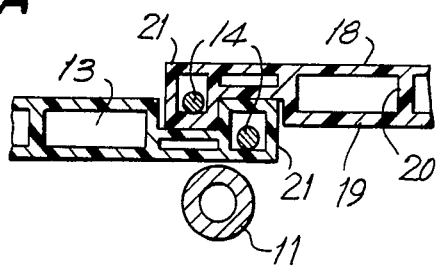
Figure 2B:
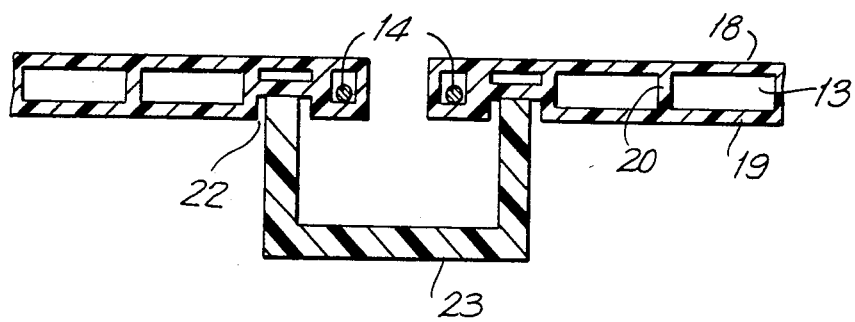
Figure 3:
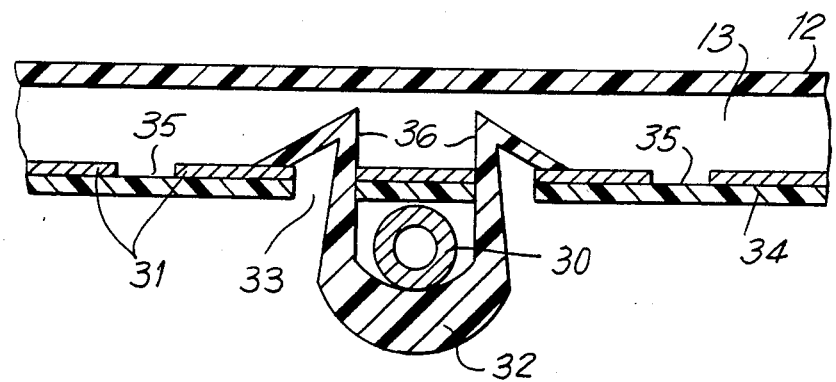

Features of the present invention which accomplish this object are evident from the accompanying drawings, in which FIG. 1 is a cross-sectional view of a barrel arch structure comprising an arcuate surface element supported on an arcuate support element;

FIGS. 2A and 2B are each cross-sectional views through the barrel arch taken along line 2—2 of FIG. 1 and show different embodiments of means for joining the arcuate surface elements at the edges thereof; and FIG. 3 is a partial cross-sectional view through another embodiment of the invention comprising purlins as support elements.

In the embodiment shown in FIG. 1, surface element 12 is arcuate and is supported on similarly arcuate support element 11. Flexible rod 14 extends through hollow space 13 in surface element 12. Projecting ends 15 of rod 14 run through bores in angle pieces 16 and are tightened below these pieces with clamp straps 17. Surface element 12 is held to support element 11 by the tightening force. Surface element 12 is free to move relative to the support element 11, for example under the influence of thermal expansion forces.

By assembling a row of similar structural elements, a continuous barrel arch can be erected. Arcuate support elements 11 are placed at such intervals that they support the edges of surface elements 12, which are suitably of an extruded synthetic resin. Each surface element is rigid but, if of considerable size, may also be flexible. The surface element may be plane or corrugated, but preferably has an arcuate curvature.

Surface elements 12 are preferably extruded as a unit from a rigid transparent plastic such as polymethacrylate, polycarbonate, polyvinyl chloride, polypropylene, and the like. In particular, they may constitute so-called double-walled web panels comprising two parallel layers 18 and 19 and webs 20 disposed perpendicularly thereto, as shown particularly in FIGS. 2A and 2B. These panels enclose a plurality of hollow chambers 13. The radius of curvature is limited by the stiffness or flexibility of the synthetic resin material and generally ranges from 1 to 10 meters. The structural element preferably has a span, shown in FIG. 1 as s, ranging from 0.5 to 10 meters and an apex height h between 0.1 and 5 meters.

As a rule, one rod 14 in each of the chambers at the two edges of a surface element 12 will suffice for fastening the surface element to support element 11. However, additional rods 14 may be introduced into intermediate hollow chambers if necessary or desirable.

The walls of the hollow chambers which accommodate the mounting rods 14 must be of sufficient thickness to withstand the stresses which will arise. Wall thicknesses ranging from 0.5 to 5 mm will generally prove adequate. The hollow chambers, including the outer walls which enclose them, may have a thickness ranging from 5 to 50 mm, for example.

Rods 14 may be of metal, such as wire, and particularly may be of plastic-covered metal, or may be flat straps of metal or plastic. They may also consist of stranded wire or braided ribbon formed of a plurality of individual fibers. Ribbons made of colorless tough plastics such as polyamide will be practically invisible when inserted in a transparent surface element. Rods 14 are introduced into the hollow space, usually before the structural element is assembled, in such a way that their ends 15 project from the open ends of the hollow chambers. Ends 15 then serve to fasten the surface element to support element 11. This may be done by the use of a wide variety of means, of which the type of fastener shown in FIG. 1 is merely an example.

As is particularly shown in FIGS. 2A and 2B, the surface elements of adjacent structural elements in accordance with the invention may overlap at their junctions and, if desired, may be interlocked by means of beaded seams 21 as shown in FIG. 2A. However, they may also be provided with groove 22 in proximity to their edges and may be mounted with such a groove on U-shaped support element 23, as shown in FIG. 2B.

The method of securing rods 14 to support element 11 is determined largely by the position of the support elements or by their arrangement as a supporting substructure. Thus, in the embodiment of FIG. 3, the support elements are horizontally disposed purlins 30 on which plane or curved surface element 12 is supported with line contact. Perforated strap 31 is inserted in hollow chamber 13 of element 12. Anchors 32 embrace purlin 30 and are secured, through openings 33 in wall 34 of surface element 12, in apertures 35 within perforated strap 31. If wall 34 is thin and tough, as is, for example, a polycarbonate layer from 0.5 to 1 mm thick, an anchor 32 provided with barbed prongs 36 can be pushed through the material forming wall 34 without need for a pilot hole and can in this way be inserted in perforated strap 31, where the anchor will be secured by the barbs on its prongs.

The structural element in accordance with the invention is easy to fabricate and to install. In its simplest embodiment, no bores or other anchoring means are required on the surface element itself. Rod 14, serving as a mounting element, lies protected in the interior of hollow chambers 13 of surface element 12 and thus is not exposed to corrosion and weathering. The rod is in contact with the inner wall of the hollow chamber almost continuously so that the holding stresses acting between the rod and the surface element are distributed over the entire length of the surface element. Point stresses thus are avoided. In addition, since external mounting means are dispensed with, the novel surface element has a pleasing appearance.

What is claimed is:

1. A structural element comprising, in combination, a panel element having laterally spaced ends, a support element located below and in engagement with said panel element between said laterally spaced ends whereby said panel element is supported on said support element, said panel element being formed of extruded rigid plastic having a plurality of walls formed therein defining at least one continuous integrally extruded hollow chamber extending between said spaced ends of said panel element, mounting element means for holding said panel element against its associated support element and securing it thereto, said mounting element means comprising a rod extending through the entire length of said at least one hollow chamber, and means for tensioning said rod against said support element at the ends of the panel element thereby to support the panel element between its spaced ends on said support element.

2. A structural element as in claim 1, wherein said rod has free ends which project from said hollow chamber, and said means for tensioning said rod includes fastening means secured between the ends of the rod and said support element.

3. A structural element as in claim 1 wherein said panel element is arcuate.

4. A structural element as in claim 1 wherein said support element is located in alignment with said hollow chamber.

5. A structural element comprising, in combination, a panel element having laterally spaced ends, a support element located below and in engagement with said panel element between said laterally spaced ends whereby said panel element is supported on said support element, said panel element being formed of extruded rigid plastic having a plurality of walls formed therein defining at least one continuous integrally extruded hollow chamber extending between said spaced ends of said panel element, mounting element means for holding said panel element against its associated support element and securing it thereto, said mounting element means comprising a rod extending through the entire length of said at least one hollow chamber, and means for tensioning said rod against said support element, said panel element having openings formed in the wall thereof which is in engagement with the support element, and said means for tensioning said rod being secured to said rod through said openings, thereby to support the panel element between its spaced ends on said support element.

* * * * *